United States Patent [19]

Bravo

[11] Patent Number: 4,935,602
[45] Date of Patent: Jun. 19, 1990

[54] HEATING APPARATUS OF TANK TYPE

[75] Inventor: Genesio Bravo, Vicenza, Italy

[73] Assignee: Bravo S.p.A., Vicenza, Italy

[21] Appl. No.: 323,370

[22] Filed: Mar. 14, 1989

[30] Foreign Application Priority Data

Mar. 18, 1988 [IT] Italy ............................... 20889/88[U]

[51] Int. Cl.⁵ ............................................... H05B 1/00
[52] U.S. Cl. ..................................... 219/311; 219/320; 219/335; 219/549; 219/336
[58] Field of Search ............... 219/311, 320, 335, 336, 219/327, 310, 312, 313, 314, 548, 549; 338/2.0, 2.1, 212

[56] References Cited

U.S. PATENT DOCUMENTS 2,329,116  9/1943  Heilman ........................ 219/320 X Primary Examiner—C. L. Albritton
Attorney, Agent, or Firm—Charles E. Brown; Charles A. Brown

[57] ABSTRACT

Heating apparatus of tank type comprises a first and a second heating element in a flexible material applied respectively onto the peripheral and bottom wall. The first and the second element have respectively a substantially rectangular and circle-sector shape.

13 Claims, 2 Drawing Sheets

HEATING APPARATUS OF TANK TYPE

For the processing of alimentary products of fluid or paste-like consistency, tanks are known, which are heated by means of electrical resistors applied onto the outer surface of the tanks.

The general purpose of the present invention is that of providing a tank heated with a heating system using flexible heating elements, so shaped as to be easily applied onto the outer surface of the tank, and which can be easily connected with one another, and with the power supply line.

In view of the above purpose, the present Applicant devised to provide a heating apparatus of tank type, of the type using heating means constituted by heating resistors embedded in a flexible material, applied onto the outer walls of the tank, characterized in that the heating means comprise a first element of substantially rectangular shape applied onto the peripheral wall of the tank, and of a second element substantially having a circle-sector shape applied onto the bottom wall of the tank, with the elements containing the electrical resistors and being connected by means of a bridge made from a flexible material, containing the electrical connections between the resistors contained in the first element, and the resistors contained in the second element.

In order to explain more clearly the present invention and its advantages as compared to the prior art, reference is made now to the hereto attached drawings, in which.

Figure 1:
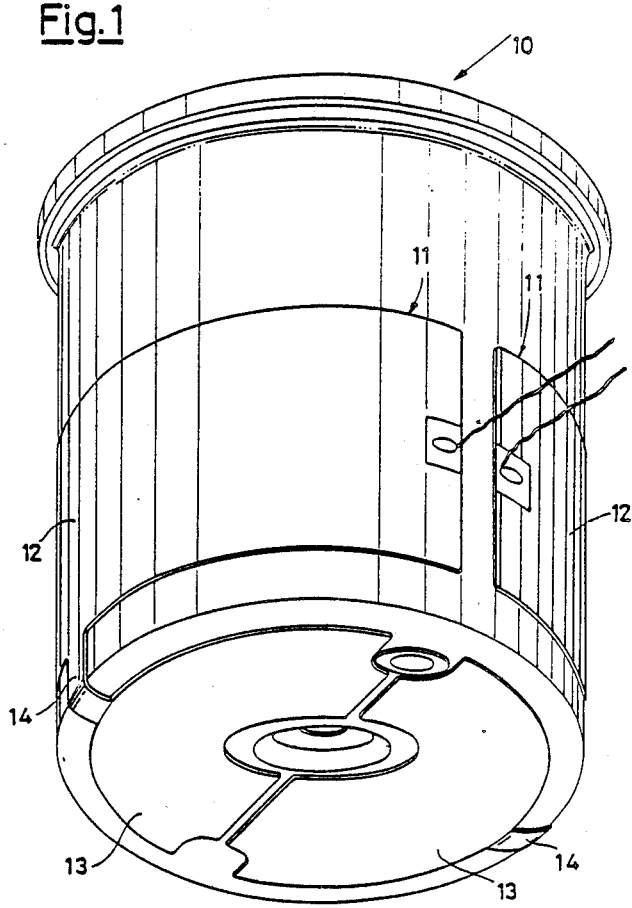
FIG. 1 shows a schematic, perspective view of a first practical embodiment of a tank, in which the innovative principles of the present invention are applied.

Referring to the drawings, in FIG. 1 a schematic view of a tank 10 is shown, on the walls of which flexible, electrical-resistor heating elements 11 are bonded by means of an adhesive.

Figure 2:
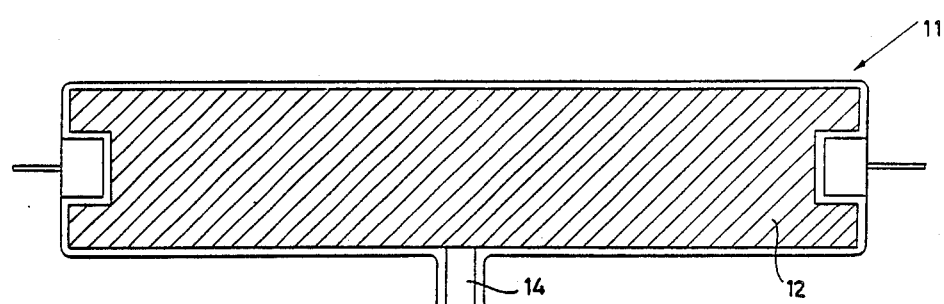
FIG. 2 shows the development in plane of a heating element of the tank of FIG. 1.
Figure 2:
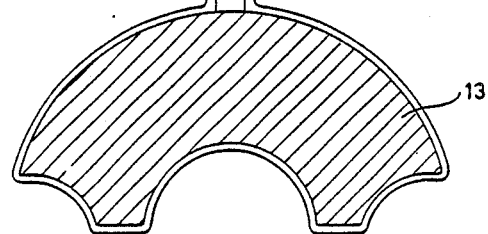

The flexible elements are composed by electrical resistors embedded inside a sheet of a flexible material with a self-adhesive face, shaped (as one can better see from FIG. 2) into two parts.

The first part 12, of straight shape, has such a length as to surround a half of the peripheral wall of the tank, and has a suitable height in order to make it possible the peripheral wall to be correctly heated.

The second part 13 has the general shape of a semicircular sector, with a diameter slightly lower than the diameter of the bottom wall of the tank, and is provided with a shaped contour, suitable for going around the drain holes, or any other discontinuities existing on the bottom wall of the tank.

A bridge 14 provided between the first part 12, and the second part 13 provides the electrical connection between the electrical resistors contained in the first part and in the second part.

Going back to FIG. 1, the flexible elements 11 are applied in a number of two, by means of the adhesive present on one face of them, so as to coat the side wall and the bottom wall of the tank.

The two elements are then electrically connected, e.g., in series to each other.

The above disclosed practical embodiment can be conveniently used in case a mono-phase power supply is used to feed the resistors.

Figure 3:
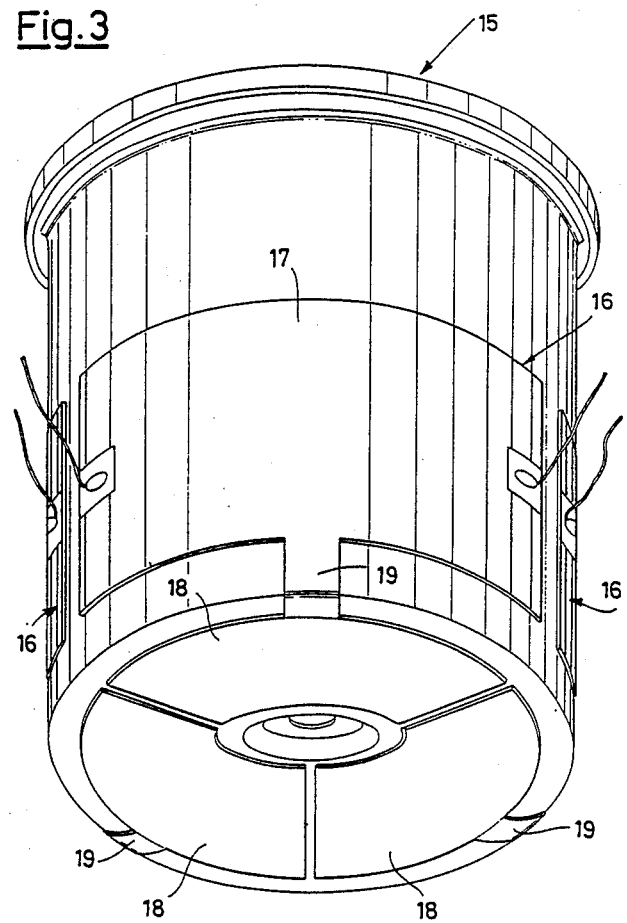
FIG. 3 shows a schematic perspective view of a second practical embodiment of a tank in which the innovative principles of the present invention are applied.

In FIG. 3 a second form of practical embodiment is shown of a tank 15, in which the innovative principles of the present invention are applied.

In the second practical embodiment, three flexible, electrical-resistor heating elements 16 are provided.

Figure 4:
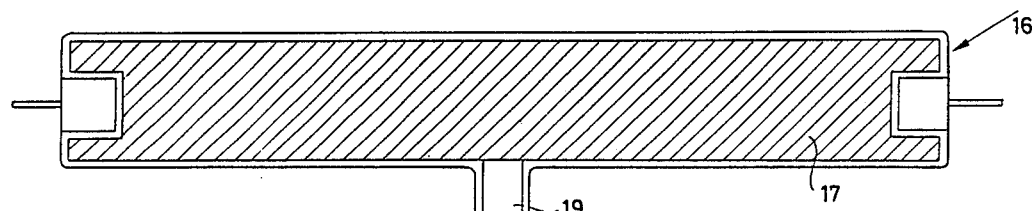
FIG. 4 shows the development in plane of a heating element of the tank of FIG. 4.
Figure 4:
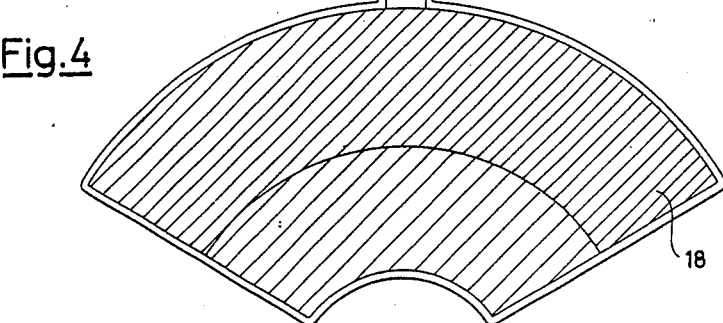

The flexible elements are composed (analogously to the elements 11) by electrical resistors embedded inside a sheet made from a flexible material with a self-adhesive face, and shaped (as one will better see from FIG. 4) into two parts.

The first part 17, of straight shpae, has such a length as to surround one third of the peripheral wall of the tank, and has such a suitable height, as to make it possible for the peripheral wall to be correctly heated.

The second part 18 has the general shape of a sector of one third of a circumference, with a diameter slightly lower than the diameter of the bottom wall of the tank, and is provided with a shaped contour, suitable for going around the drain holes, or other discontinuities existing on the bottom wall of the tank.

A bridge 19 provided between the first part 17, and the second part 18 provides the electrical connection between the electrical resistors contained in the first part and in the second part.

Going back to FIG. 3, the flexible elements 16 are applied in a number of three, by means of the adhesive provided on a face of them, so as to coat the side wall and the bottom wall of the tank.

The three elements are then electrically connected, e.g., with one another.

With obvious and suitable connections, the just above disclosed practical embodiment can be conveniently used with a three-phase power supply. Of course, it can be used as well, with the connections being suitably changed, with mono-phase power supplies also.

Whichever the number of the heating elements, and their electrical connection, either with one another, or with the power supply line, may be, it will be clear that a tank accomplished according to the innovative principles of the present invention is of a simpler structure, as regards the heating system, and its connection, than the systems known from the prior art.

Of course, the shape of the heating elements shown in the hereto attached drawings, and hereinabove disclosed, is supplied for merely exemplifying purposes. The shape can be changed in order to match any tank shape requirements, and, in particular, in order to go around drain holes, supports, and any other elements which may be present on the outer surface of the tank, and which one does not want to cover with the heating elements.

Finally, the electrical resistors inside the first part and the second parts can be so accomplished as to generate different amounts of heat, so as to supply a larger amount of the heat in those regions of the tank, in which the heat dispersion is greater. In order to obtain such differentiated-temperature regions, one can, e.g., change the value of the electrical resistors, by increasing it, or decreasing it, in the various regions in which a larger, or a smaller, amount of heat is desired, or various sections of the electrical resistors inside the first parts and the second parts can be variously connected with each other in a suitable way, as anyone skilled in the art can easily imagine.

I claim:

1. A heating apparatus for a tank having a bottom wall and a peripheral wall extending from the bottom wall, the bottom wall and the peripheral wall each having an inner wall surface and an outer wall surface, said heating apparatus having heating means in the form of electrical heating resistors, said electrical heating resistors being embedded in a flexible material, the flexible material being applied onto the outer wall surfaces of the tank, said heating means comprising a first heating element having a substantially rectangular shape and being applied onto the outer surface of the peripheral wall of the tank, and a second heating element having a substantially circle-sector shape and being applied onto the outer surface of the bottom wall of the tank, said first and second heating elements each containing the electrical heating resistors, said first heating element and said second heating element being connected to each other by means of a bridge, said bridge being made from a flexible material, said bridge containing electrical connections between the electrical heating resistors contained in said first heating element and the electrical heating elements contained in said second heating element, the tank having an outer perimeter, said first heating element having a length which is a half of the outer perimeter of the tank, said second heating element being substantially a sector corresponding to a half of the outer surface of the bottom wall of the tank, and said first heating element and said second heating element being at least two in number on the tank.

2. The heating apparatus for a tank as claimed in claim 1, wherein said first and second heating elements are electrically connected for being fed from a monophase power supply.

3. The heating apparatus for a tank as claimed in claim 1, wherein said first heating element and said second heating element each has notches provided to go around specific regions of the tank.

4. The heating apparatus for a tank as claimed in claim 1, wherein said first and second heating elements are provided with a differentiated-heating areas.

5. The heating apparatus for a tank as claimed in claim 4, wherein said differentiated-heating areas are accomplished by means of electrical resistors of different valves in said areas.

6. A heating apparatus for a tank having a bottom wall and a peripheral wall extending from the bottom wall, the bottom wall and the peripheral wall each having an inner wall surface and an outer wall surface, said heating apparatus having heating means in the form of electrical heating resistors, said electrical heating resistors being embedded in a flexible material, the flexible material being applied onto the outer wall surfaces of the tank, said heating means comprising a first heating element having a substantially rectangular shape and being applied onto the outer surface of the peripheral wall of the tank, and a second heating element having a substantially circle-sector shape and being applied onto the outer surface of the bottom wall of the tank, said first and second heating elements each containing the electrical heating resistors, said first heating element and said second heating element being connected to each other by means of a bridge, said bridge being made from a flexible material, said bridge containing electrical connections between the electrical heating resistors contained in said first heating element and the electrical heating elements contained in said second heating element, the tank having an outer perimeter, said first heating element having a length which is one third of the outer perimeter of the tank, said second heating element being substantially a sector corresponding one third of the outer surface of the bottom wall of the tank, and said first and second heating element being at least three in number on the tank.

7. The heating apparatus for a tank as claimed in claim 6, wherein said three heating elements are electrically connected for being fed from a three-phase power supply.

8. The heating apparatus for a tank as claimed in claim 6, wherein said first heating element and said second heating element each has notches provided to go around specific regions of the tank.

9. The heating apparatus for a tank as claimed in claim 6, wherein said first and second heating elements are provided with differentiated-heating areas.

10. The heating apparatus for a tank as claimed in claim 9, wherein said differentiated-heating areas are accomplished by means of electrical resistors of different valves in said areas.

11. A heating apparatus for a tank having a bottom wall and a peripheral wall extending from the bottom wall, the bottom wall and the peripheral wall each having an inner wall surface and an outer wall surface, said heating apparatus having heating means in the form of electrical heating resistors, said electrical heating resistors being embedded in a flexible material, the flexible material being applied onto the outer wall surfaces of the tank, said heating means comprising a first heating element having a substantially rectangular shape and being applied onto the outer surface of the peripheral wall of the tank, and a second heating element having a substantially circle-sector shape and being applied onto the outer surface of the bottom wall of the tank, said first and second heating elements each containing the electrical heating resistors, said first heating element and said second heating element being connected to each other by means of a bridge, said bridge being made from a flexible material, said bridge containing electrical connections between the electrical heating resistors contained in said first heating element and the electrical heating elements contained in said second heating element, said first heating element and said second heating element each having notches provided to go around specific regions of the tank.

12. The heating apparatus for a tank as claimed in claim 11, wherein said first and second heating elements are provided with differentiated-heating areas.

13. The heating apparatus for a tank as claimed in claim 12, wherein said differentiated-heating areas are accomplished by means of electrical resistors of different valves in said areas.

* * * * *